3,732,293
IODINATED BIS(AMINOBENZOIC ACIDS) AND
ESTERS THEREOF
James H. Ackerman, Bethlehem, N.Y., assignor to
Sterling Drug Inc., New York, N.Y.
No Drawing. Continuation-in-part of application Ser. No.
713,302, Mar. 15, 1968, now Patent No. 3,542,861,
which is a continuation-in-part of application Ser. No.
550,605, May 17, 1966. This application Nov. 13, 1969,
Ser. No. 876,615
Int. Cl. C07c 147/12, 147/14, 149/34
U.S. Cl. 260—516
8 Claims

ABSTRACT OF THE DISCLOSURE

Bis(3 - carbonylamino - 2,4,6 - triiodo - 5 - substituted-benzoic acids) bridged at the 3-position by an oxygen or sulfur interrupted alkylene chain, useful as intravenous cholecystographic agents, are prepared by reaction of a 3-amino-5-substituted-2,4,6-triiodobenzoic acid with the appropriate dibasic acid dihalide.

This application is a continuation-in-part of my prior copending application, Ser. No. 713,302, filed Mar. 15, 1968 now U.S. Pat. 3,542,861, which in turn is a continuation-in-part of my prior application Ser. No. 550,605, filed May 17, 1966, now abandoned.

This invention relates to new iodinated organic acids and derivatives thereof, and to their preparation. More particularly, the invention is concerned with bis(3-carbonylamino - 2,4,6 - triiodo-5-substituted-benzoic acids) bridged at the 3-position by an oxygen or sulfur interrupted alkylene chain, with salts and esters thereof, and with methods for their preparation.

The invention sought to be patented resides in the concept of a composition of matter having a molecular structure wherein two 3-carbonylamino-2,4,6-triiodobenzoic acid moieties substituted in the 5-position by a substituted amino or carbamyl group are linked together at the respective 3-positions by an oxygen or sulfur interrupted alkylene bridge. The invention also includes esters and salts of said acid moieties, and certain novel intermediates in the preparation thereof.

The preferred aspect of the invention comprises compounds of the following general formula

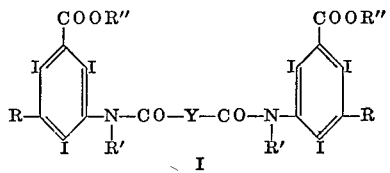

wherein R is $H_2N$, (lower-alkanoyl)$_2N$, (lower-alkyl)NHCO (lower-alkyl$_2$)NCO, (lower-alkyl)$_2$NCH=N,

T—CO—NH

T—CO—NHCH$_2$, or (T—CO)N(lower-alkyl), where T is hydrogen, cycloalkyl of 3–6 ring members, or alkyl of 1–8 carbon atoms optionally interrupted by from 1 to 4 oxygen atoms, each oxygen, when more than one, being separated by at least two carbon atoms; R' is hydrogen or lower-alkyl; R'' is hydrogen or lower-alkyl; and Y is an alkylene bridge having from two to eight carbon atoms and interrupted by —S—S— or by from one to three members selected from O, S, SO and $SO_2$, said members, when more than one, being separated by at least two carbon atoms.

When the alkylene bridge Y' is interrupted by more than one O, S, So (sulfoxide) or $SO_2$ (sulfone) interruptants, the interruptant atoms or groups may be the same or different, although in the case of the sulfone or sulfoxide groups it is preferred that the interruptants in any given compound be identical because of the more ready availability of starting materials. It is also to be understood that the word "interrupted" means interposed between carbon atoms and not embracive of compounds wherein the heteroatoms are in a terminal position adjacent to the carbonyl groups. The heteroatoms in the alkylene bridge Y', when more than one are present, are separated by at least two carbon atoms. This carbon atom separated is of course linear (—C—C—, —C—C—C—, etc.), although the carbon atoms may in turn be substituted by lower-alkyl.

The group Y is thus illustrated by such divalent groups as —CH$_2$S—SCH$_2$—, —CH$_2$CH$_2$S—SCH$_2$CH$_2$—,

—CH$_2$CH$_2$CH$_2$CH$_2$S—SCH$_2$CH$_2$CH$_2$CH$_2$—

—CH$_2$CH$_2$S—SCH$_2$CH$_2$CH$_2$CH$_2$—, —CH$_2$OCH$_2$—,

—CH$_2$SCH$_2$—, —CH$_2$CH$_2$OCH$_2$CH$_2$—

—CH$_2$CH$_2$OCH$_2$CH$_2$OCH$_2$CH$_2$—,

—CH$_2$CH$_2$SCH$_2$CH$_2$SCH$_2$CH$_2$—

—CH$_2$CH$_2$OCH$_2$CH$_2$SCH$_2$CH$_2$OCH$_2$CH$_2$—,

—CH$_2$CH$_2$OCH(CH$_3$)CH(CH$_3$)OCH$_2$CH$_2$—

—CH$_2$SOCH$_2$—, —CH$_2$SO$_2$CH$_2$—,

—CH$_2$CH$_2$SOCH$_2$CH$_2$SOCH$_2$CH$_2$—

—CH$_2$CH$_2$SO$_2$CH$_2$CH$_2$SO$_2$CH$_2$CH$_2$—,

—CH$_2$CH$_2$SO$_2$CH$_2$CH$_2$SO$_2$—CH$_2$CH$_2$SO$_2$CH$_2$CH$_2$— and the like.

The term lower-alkyl, used in defining R' and R'' and in the groups which R represents, stands for alkyl groups having from one to six carbon atoms, thus including methyl, ethyl, propyl, isopropyl, butyl, isobutyl, pentyl, hexyl, and the like.

When R stands for (lower-alkanoyl)$_2$N, lower-alkanoyl has from two to about six carbon atoms, thus including acetyl, propionyl, butyryl, isobutyryl, valeryl, caproyl and the like.

In the foregoing definitions, when T stands for cycloalkyl of 3–6 ring members, cycloalkyl thus includes cyclopropyl, cyclobutyl, cyclopentyl, cyclohexyl and lower-alkylated derivatives thereof, for example, 2-methylcyclopropyl, 3 - ethylcyclopentyl, 3,4 - dimethylcyclohexyl, and the like.

A particularly preferred aspect of the invention resides in compounds of the formula

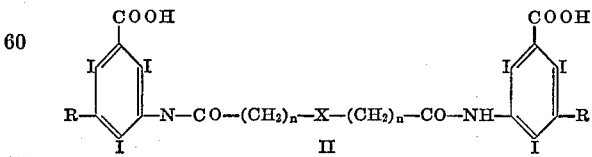

wherein R is (lower-alkanoyl)N(lower-alkyl), X is O, S, SO or $SO_2$ and $n$ is an integer from 1 to 4.

The compounds of the invention can be prepared by the following general methods:

(A) From 3-amino-5-R-2,4,6-triiodobenzoic acid

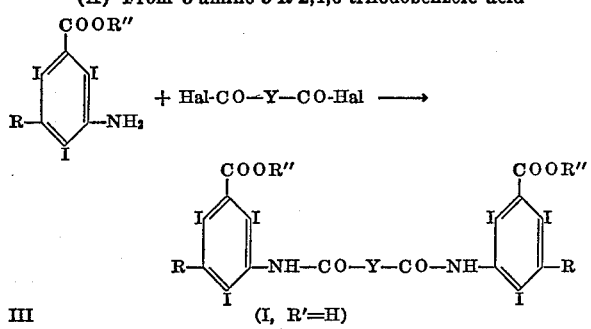

The starting materials of Formula III, except those where R is (cycloalkylcarbonyl)NH or (cycloalkylcarbonyl)N(lower-alkyl) belong to known classes of compounds, readily prepared from 3-nitro-5-aminobenzoic acid by conventional methods.

According to the present invention, a 3-amino-5-R-2,4,6-triiodobenzoic acid or an ester thereof (III), where R is T—CO—NH, T—CO—NHCH$_2$, (T—CO)N(lower-alkyl), (lower-alkyl)NHCO, or (lower-alkyl)$_2$NCO, is reacted with a diacid halide, Hal—CO—Y—CO—Hal, where Hal is middle halogen (chlorine or bromine), to yield a compound of Formula I where R' is hydrogen. The reaction is preferably carried out by heating the reactants in an inert solvent at a temperature between about 80° C. and 150° C. Examples of inert solvents include dioxane, dimethylformamide and dimethylacetamide. Dioxane is an especially preferred solvent.

The compounds of Formula I where R' is lower-alkyl are prepared by an alkylation step, that is by reaction of the compounds where R' is hydrogen with a lower-alkyl sulfate, alkanesulfonate, arenesulfonate or halide (preferably chloride, bromide, iodide) under alkaline conditions.

(B) From 3-amino-5-nitrobenzoic acid

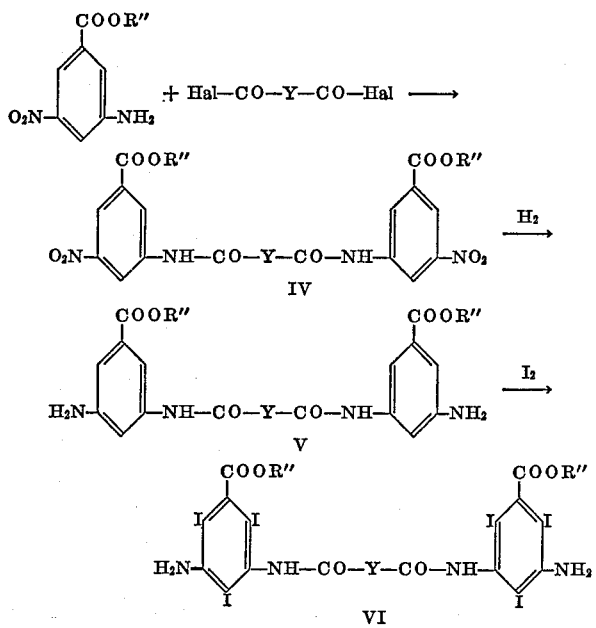

According to the invention, 3-amino-5-nitrobenzoic acid or an ester thereof is reacted with a diacid halide, Hal—CO—Y—CO—Hal where X is middle halogen (chlorine or bromine), to yield a bis amide (IV). Hydrogenation of the latter reduces the nitro groups to amino groups, and the resulting compound of Formula V is then iodinated to give the intermediate of Formula VI. A compound of Formula VI can be acylated with an alkanoic, alkoxyalkanoic or cycloalkanecarboxylic acid anhydride or halide to give a compound of Formula I where R is T—CO—NH or (lower-alkanoyl)$_2$N and R' is hydrogen, which can then, if desired, be alkylated with a lower-alkyl sulfate, sulfonate or halide to give a compound of Formula I where R is (T—CO)N(lower-alkyl)

and R' is lower-alkyl. Alternatively, a compound of Formula VI can be dialkylated with a lower-alkyl sulfate, sulfonate or halide, followed by acylation to give a compound of Formula I where R is T—CO—NH or (lower-alkanoyl)$_2$N and R' is lower-alkyl. A compound of Formula VI can also be reacted with a di-lower-alkylformamide in the presence of phosphorus oxychloride, preferably with prior alkylation on the amide nitrogens, to give a compound of Formula I where R is (lower-alkyl)$_2$NCH=N and R' is H or lower-alkyl.

The compounds of Formula II where X is SO or SO$_2$ can alternatively be prepared by oxidation of the corresponding compounds of Formula II where X is S with a peracid. The reaction takes place at room temperature in an inert organic solvent.

The structures of the compounds of the invention were established by the modes of synthesis, by elementary analysis and spectral determinations. The progress of the reactions was followed by thin layer chromatography.

The invention contemplates compounds of Formula I where R" is hydrogen either in the form of the free acids or in the form of salts derived from inorganic bases or organic amines. Preferred types of salts are those having pharmacologically acceptable cations, e.g., the sodium, calcium, magnesium or N-methylglucamine salts, although all types of salts, including those having toxic cations are within the purview of the invention because they are useful as intermediates or as characterizing derivatives for the free acids.

The compounds of Formula I where R" is hydrogen, in the form of their water-soluble, pharmacologically acceptable salts, have been found to be excellent X-ray contrast agents for visualization of the gallbladder upon intravenous injection. They possess low intravenous toxicity, LD$_{50}$ values ranging from 3000 to 19,000 mg./kg. in mice. The particularly preferred compounds, represented by Formula II above, have LD$_{50}$ values ranging from 9000 to 19,000 mg./kg. as compared with values of 3070 and 5300 mg./kg., respectively, for the known commercially available intravenous cholecystographic agents, N,N'-bis(3-carboxy - 2,4,6 - triiodophenyl)adipamide (iodipamide) and 3,3'-(diglycoloyldiimino)bis (2,4,6-triiodobenzoic acid) (ioglycamide).

The actual quantitative determination of toxicity and radiopaque effectiveness for a particular compound is readily determined by standard test procedures by technicians trained in pharmacological test procedures, without the need for any extensive experimentation. The compounds were tested for their intravenous cholecystographic efficacy by standard procedure as follows: The test compound was injected intravenously in the form of an aqueous solution of the sodium or N-methylglucamine salt to cats. Each cat was X-rayed at hourly intervals and the roentgenograms examined and evaluated. The density of the gallbladder shadows was interpreted in accordance with a numerical scoring plan designated as the Cholecystographic Index (CI), a measure of the efficiency of the test compound, viz.: 0 (none), 1 (poor), 2 (fair), 3 (good), 4 (excellent) [see J. O. Hoppe, J. Am. Pharm. Assoc., Sci. Ed. 48, 368–79 (1959)]. The compounds of the present invention have a favorable bile/urine ratio and maximum Cholecystographic Index values ranging from 3.0 to 4.0 at a dose level of 100 mg./kg.

The compounds of the invention are prepared for use by dissolving a pharmaceutically acceptable salt form in sterile aqueous medium suitable for intravenous injection.

The ester compounds of Formula I (R″ is lower-alkyl) are useful either as intermediates in the preparation of the corresponding acids (R″ is hydrogen), or as radiopaque agents for visualization of body cavities by direct injection therein, e.g., in bronchographical procedures.

The following examples will further illustrate the invention without the latter being limited thereby.

EXAMPLE 1

3,3′-[(3,3′ - thiodipropionyl)diimino]bis[2,4,6-triiodo-5-(N-methylacetamido)benzoic acid] [II; R is

X is S, $n$ is 2]: A mixture of 29.3 g. of 3-amino-5-(N-methylacetamido)-2,4,6-triiodobenzoic acid [M.P. 249.0–249.5° C. (dec.)] and 5.38 g. of 3,3′-thiodipropionyl chloride in 150 ml. of pure dioxane was refluxed for three days. The reaction mixture was cooled, and the solid product (17.3 g.) collected by filtration, suspended in 100 ml. of absolute methanol and 26 ml. of 1 N sodium hydroxide in methanol added. The resulting solution was treated with activated charcoal, filtered, and the filtrate added dropwise to 1.5 liters of absolute ether with stirring. The suspension was stirred for 30 minutes, the solid collected and dissolved in 100 ml. of methanol, and the solution treated with activated charcoal and filtered. The filtrate was added to 1 liter of chloroform with stirring, and the solid product collected and dried for three days at 85° C. (0.2 mm.) to give 3,3′-[(3,3′-thiodipropionyl)diimino]bis[2,4,6-triodo - 5 - (N-methylacetamido)-benzoic acid] in the form of its disodium salt, M.P. 238–245° C. (dec.).

A solution of the latter disodium salt in water was acidified with 3 N hydrochloric acid, the suspension stirred for 30 minutes, and the solid product collected, washed with distilled water and dried to constant weight in vacuo at 100–130° C. There was thus obtained 3,3′-[(3,3′-thiodipropionyl)diimino]bis[2,4,6-triiodo - 5 - (N-methylacetamido)benzoic acid], M.P. 265.0–271.0° C. (dec.).

3,3′ - [(3,3′ - thiodipropionyl)diimino]bis[2,4,6-triodo-5-(N-methylacetamido)benzoic acid] can be treated with calcium hydroxide, magnesium hydroxide or N-methylglucamine to give, respectively, the calcium, magnesium or di-(N-methylglucamine) salts.

EXAMPLE 2

3,3′ - [(3,3′ - thiodipropionyl)diimino]bis[2,4,6-triodo-5-(N-ethylacetamido)benzoic acid] [II; R is $(CH_3CO)N(C_2H_5)$—, X is S, $n$ is 2]: 3-amino-5-(N-ethylacetamido)-2,4,6-triiodobenzoic acid 160 g. M.P. 2.59.0–260.0° C. (dec.)] was dissolved in 800 ml. of pure dioxane, and 250 ml. of the dioxane was distilled off to remove residual moisture. 3,3′-thiodipropionyl chloride (10.75 g.) was then added, and the mixture was refluxed under anhydrous conditions until evolution of hydrogen chloride ceased (about five days). The reaction mixture was distilled to remove 300 ml. of dioxane, then cooled, and the solid product (35 g.) collected by filtration. The solid was dissolved in dilute sodium hydroxide (about 150 ml.), 5 ml. of ethanol added, the solution treated with activated charcoal, filtered, and acidified with 3 N hydrochloric acid. The product was collected, washed with 10% acetic acid solution and dried to constant weight in vacuo at 100–130° C. to give 3,3′-[(3,3′-thiodipropionyl)diimino] bis[2,4,6-triiodo-5-(N-ethylacetamido)benzoic acid], M.P. 243–244° C. (dec.).

EXAMPLE 3

3,3′ - [(thiodiacetyl)diimino]bis[2,4,6-triiodo-5-(N-ethylacetamido)benzoic acid] [II; R is

X is S, $n$ is 1] was prepared from 42.89 g. of 3-amino-5-(N-ethylacetamido)-2,4,6-triiodobenzoic acid and 6.69 g. of thiodiacetyl chloride in 350 ml. of dioxane according to the procedure described above in Example 2, and was obtained in the form of a colorless solid, M.P. 256–258° C. (dec.).

EXAMPLE 4

3,3′(diglycolyldiimino)bis[2,4,6 - triiodo - 5 - (N-methylacetamido)benzoic acid] [II; R is

X is O, $n$ is 1]: A mixture of 46.9 g. of 3-amino-5-(N-methylacetamido)-2,4,6-triiodobenzoic acid and 6.84 g. of diglycolyl chloride in 200 ml. of dioxane was refluxed until evolution of hydrogen chloride ceased (about 24 hours). The reaction mixture was cooled and the solid which separated was collected and dissolved in dilute sodium hydroxide, and the solution filtered and acidified slowly with dilute hydrochloric acid. The product was collected and dried in vacuo at 100–135° C. to give 3,3′-(diglycolyldiimino)bis[2,4,6-triiodo - 5 - (N-methylacetamido)benzoic acid], M.P. 270.8–272.6° C. (dec.).

EXAMPLE 5

3,3′-[(thiodiacetyl)diimino]bis[2,4,6 - triiodo - 5 - (N-methylacetamido)benzoic acid] [II; R is

X is S, $n$ is 1] was prepared from 29.3 g. of 3-amino-5-(N-methylacetamido)-2,4,6-triiodobenzoic acid and 4.68 g. of thiodiacetyl chloride in 200 ml. of dioxane according to the procedure described above in Example 1. The product was obtained first in the form of the disodium salt, M.P. 273.0–273.5° C. (dec.), and then as the free acid, M.P. 247–256° C. (dec.).

EXAMPLE 6

5,5′-[(3,3′ - thiodipropionyl - diimino]bis[2,4,6-triiodo-N-methylisophthalamic acid] [I; R is CH₃NHCO—, R′ and R″ are H, Y is $CH_2CH_2SCH_2CH_2$] was prepared from 57.2 g. of 5-amino-2,4,6-triiodo-N-methylisophthalamic acid [M.P. 265.4–266.4° C. (dec.)] and 10.76 g. of 3,3′-thiodipropionyl chloride in 700 ml. of dioxane, refluxed until evolution of hydrogen chloride ceased. The solid product was dissolved in isopropyl alcohol and neutralized with ammonium hydroxide. The mixture was distilled until the water was removed and the resulting solid collected to give 58.2 g. of 5,5′-[(3,3′-thiodipropionyl)diimino]bis[2,4,6-triiodo - N - methylisophthalamic acid] in the form of its diammonium salt, M.P. 258° C (dec.). The latter was converted to the free acid, M.P. 265° C. (dec.).

EXAMPLE 7

3,3′-[(3,3′ - thiodipropionyl)diimino]bis[2,4,6 - triiodo-5-(N-methylpropionamido)benzoic acid] [II; R is $(CH_3CH_2CO)N(CH_3)$—, X is S, $n$ is 2] was prepared from 60 g. of 3-amino-5-(N-methylpropionamido)-2,4,6-triiodobenzoic acid [M.P. 247° C. (dec.)] and 10.75 g. of 3,3′-thiodipropionyl chloride in 700 ml. of dioxane. The product was converted to its diammonium salt in isopropyl alcohol and then acidified to the free acid to give 3,3′-[(3,3′-thiodipropionyl)diimino]bis[2,4,6-triiodo-5-(N - methylpropionamido)benzoic acid], M.P. 254° C. (dec.).

EXAMPLE 8

3,3′-[(3,3′-thiodipropionyl)diimino]bis[2,4,6 - triiodo-5-(N-methylbutyramido)benzoic acid] [II; R is $(CH_3CH_2CH_2CO)N(CH_3)$—, X is S, $n$ is 2] was prepared from 43 g. of 3-amino-5-(N - methylbutyramido)-2,4,6-triiodobenzoic acid [M.P. 249.0–249.5° C. (dec.)] and 7.54 g. of 3,3'-thiodipropionyl chloride in 350 ml. of dioxane, and was obtained in the form of a colorless solid, M.P. 241–245° C. (dec.).

EXAMPLE 9

3,3'-[(3,3'-thiodipropionyl)diimino]bis[2,4,6 - triiodo-5-(N-butylacetamido)benzoic acid] [II; R is $$(CH_3CO)N(C_4H_9)—,$$

X is S, $n$ is 2] was prepared from 42.4 g. of 3-amino-5-(N - butylacetamido) - 2,4,6 - triiodobenzoic acid [M.P. 152.0–175.0° C.; sodium salt M.P. 225.0–233.0° C. (dec.)] and 7.25 g. of 3,3'-thiodipropionyl chloride in 250 ml. of dioxane, and was obtained in the form of a colorless solid, M.P. 236–237° C. (dec.).

EXAMPLE 10

3,3'-[(3,3'-thiodipropionyl)diimino]bis[2,4,6 - triiodo-5-(N-propylacetamido)benzoic acid] [II; R is $$(CH_3CO)N(C_3H_7)—,$$

X is S, $n$ is 2] was prepared from 50 g. of 3-amino-5-(N-propylacetamido) - 2,4,6 - triiodobenzoic acid [M.P. 255° C. (dec.)] and 8.76 g. of 3,3'-thiodipropionyl chloride in 220 ml. of dioxane, and was obtained in the form of a colorless solid, M.P. 252° C. (dec.).

According to the methods described hereinabove, 3,3'-thiodipropionyl chloride can be caused to react with 3-amino - 5 - acetamido-2,4,6-triiodobenzoic acid, ethyl 3-amino - 5 - (N-methylacetamido)-2,4,6-triiodobenzoate, 5-amino-2,4,6-triiodo - N,N - dimethylisophthalamic acid, or 3-amino-5-(methoxyacetamido)-2,4,6-triiodobenzoic acid to give, respectively, 3,3'-[(3,3'-thiodipropionyl)diimino]bis[2,4,6-triiodo-5-acetamidobenzoic acid] [I; R is $$CH_3CONH—,$$

R' and R" are H, Y is $CH_2CH_2SCH_2CH_2$], diethyl 3,3'-[(3,3'-thiodipropionyl)diimino]bis[2,4,6-triiodo - 5 - (N-methylacetamido)-benzoate] [I; R is $$(CH_3CO)N(CH_3)—,$$

R' is H, R" is $C_2H_5$, Y is $CH_2CH_2SCH_2CH_2$], 5,5'-[(3,3'-thiodipropionyl)diimino]bis[2,4,6-triiodo - N,N - dimethylisophthalamic acid] [I; R is $(CH_3)_2NCO$—, R' and R" are H, Y is $CH_2CH_2SCH_2CH_2$], or 3,3'-[(3,3'-thiodipropionyl)diimino]bis[2,4,6 - triiodo - 5 - (methoxyacetamido)benzoic acid] [I; R is $(CH_3OCH_2CO)NH$, R' and R" are H, Y is $CH_2CH_2SCH_2CH_2$].

According to the foregoing procedures, 3-amino-5-(N-methylacetamido)-2,4,6-triiodobenzoic acid can be caused to react with $$Cl—COCH_2CH_2CH_2CH_2SCH_2CH_2CH_2CH_2CO—Cl,$$

$$Cl—COCH_2CH(CH_3)SCH(CH_3)CH_2CO—Cl,$$

$$Cl—COCH_2OCH_2CH_2OCH_2CO—Cl,$$

$$Cl—COCH_2SCH_2CH_2SCH_2CO—Cl,$$

or $$Cl—COCH_2OCH_2CH_2SCH_2CO—Cl,$$

to give, respectively, 3,3'-[(5,5'-thiodivaleryl)diimino]bis[2,4,6-triiodo - 5 - (N-methylacetamido)benzoic acid] [II; R is $(CH_3CON(CH_3)$—, X is S, $n$ is 4], 3,3'-[(3,3'-thiodibutyryl)diimino]bis[2,4,6-triiodo - 5 - (N - methylacetamido)benzoic acid] [I; R is $(CH_3CO)N(CH_3)$—, R' and R" are H, Y is $CH_2CH(CH_3)SCH(CH_3)CH_2$], N,N'-bis[3-(N-methylacetamido) - 5 - carboxy - 2,4,6 - triiodophenyl]-3',6'-dioxasuberamide [I; R is $$(CH_3CO)N(CH_3)—,$$

R' and R" are H, Y is $CH_2OCH_2CH_2OCH_2$], N,N'-bis[3-methylacetamido) - 5 - carboxy-2,4,6-triiodophenyl]-3',6'-dithiasuberamide [I; R is $(CH_3CO)N(CH_3)$—, R' and R" are H, Y is $CH_2SCH_2CH_2SCH_2$], or N,N'-bis[3-(N - methylacetamido) - 5 - carboxy-2,4,6-triiodophenyl]-3'-oxa-6'-thiasuberamide [I; R is $(CH_3CO)N(CH_3)$—, R' and R" are H, Y is $CH_2OCH_2CH_2SCH_2$].

EXAMPLE 11

3,3'-[(3,3'-thiodipropionyl) - N,N' - dimethyldiimino]bis[2,4,6-triiodo - 5 - (N-methylacetamido)benzoic acid] [I; R is $(CH_3CO)N(CH_3)$—, R' is $CH_3$, R" is H, Y is $CH_2CH_2SCH_2CH_2$] can be prepared by dissolving 3,3'-[(3,3'-thiodipropionyl)diimino]bis[2,4,6-triiodo - 5 - (N-methylacetamido)benzoic acid] (Example 1) in dilute sodium hydroxide and adding during 15 minutes a solution of an excess of dimethyl sulfate in acetone, followed by stirring at room temperature for several hours. The product can be obtained by acidification of the reaction mixture and collection of the precipitated solid.

EXAMPLE 12

(a) 3,3'-[(3,3' - thiodipropionyl)diimino]bis(5 - nitrobenzoic acid) [IV; R" is H, Y is $CH_2CH_2SCH_2CH_2$] can be prepared by reacting 3-amino-5-nitrobenzoic acid with 3,3'-thiodipropionyl chloride according to the procedure described above in Example 6.

(b) 3,3'-[(3,3'-thiodipropionyl)diimino]bis(5 - aminobenzoic acid) [V; R" is H, Y is $CH_2CH_2SCH_2CH_2$] can be prepared by gradually adding Raney nickel catalyst to a suspension of 3,3'-[(3,3'-thiodipropionyl)diimino]bis(5-nitrobenzoic acid) in a dilute aqueous solution of hydrazine hydrate until frothing ceases. The mixture is heated for one hour and filtered, and the filtrate acidified with acetic acid. The product is collected by filtration.

(c) 3,3' - [(3,3'-thiodipropionyl)diimino]bis(5-amino-2,4,6-triiodobenzoic acid) [VI; R" is H, Y is $$CH_2CH_2SCH_2CH_2]$$

can be prepared by stirring a mixture of 3,3'-[3,3'-thiodipropionyl)-diimino]bis(5-aminobenzoic acid) and an excess of potassium iododichloride in distilled water at room temperature for sixteen hours. The product is collected by filtration and purified through the diammonium or disodium salt.

(d) 3,3' - [(3,3' - thiodipropionyl) - N,N' - dimethyldiimino]bis(5-amino - 2,4,6 - triiodobenzoic acid) can be prepared by reacting 3,3'-[3,3'-thiodipropionyl)diimino]bis(5-amino-2,4,6-triiodobenzoic acid) with dimethyl sulfate according to the procedure described above in Example 11.

(e) 3,3'-[(3,3'-thiodipropionyl) - N,N' - dimethyldiimino]bis(2,4,6-triiodo-5-acetamidobenzoic acid) [I; R is $CH_3CONH$, R' is $CH_3$, R" is H, Y is $CH_2CH_2SCH_2CH_2$] can be prepared by heating at 100° C. for eight hours a mixture of 3,3'-[3,3'-thiodipropionyl)-N,N'-dimethyldiimino]bis(5-amino-2,4,6-triiodobenzoic acid) and an excess of acetic anhydride containing a few drops of concentrated sulfuric acid. The product is collected and purified through its diammonium or disodium salt. If the reaction mixture is heated at reflux (140° C.) instead of at 100° C. there can be obtained 3,3'-[(3,3'-thiodipropionyl)-N,N'-dimethyldiimino]bis(2,4,6-triiodo - 5 - diacetylaminobenzoic acid) [I; R is $(CH_3CO)_2N$, R' is $CH_3$, R" is H, Y is $CH_2CH_2SCH_2CH_2$].

EXAMPLE 13

3,3'-[(3,3'-thiodipropionyl) - N,N' - dimethyldiimino]bis[2,4,6 - triiodo - 5 - (dimethylaminomethylenamino)-benzoic acid] [I; R is $(CH_3)_2NCH=N$, R' is $CH_3$, R" is H, Y is $CH_2CH_2SCH_2CH_2$] can be prepared by adding phosphorus oxychloride to a cooled solution of 3,3'-[3,3'-thiodipropionyl) - N,N' - dimethyldiimino]bis(5-amino-2,4,6-triiodobenzoic acid) and an excess of dimethylformamide in chloroform.

EXAMPLE 14

3,3' - [(3,3'-sulfonyldipropionyl)diimino]bis[2,4,6-triiodo - 5 - (N-methylacetamido)benzoic acid] [II; R is $(CH_3CO)N(CH_3)$—, X is $SO_2$, n is 2]: A mixture of 278 g. (0.470 mole) of 3-amino - 5 - (N-methylacetamido)-2,4,6-triiodobenzoic acid and 850 ml. of dioxane was stirred and heated at reflux for about 30 minutes until solution was effected. Dry toluene (70 ml.) was added and 350 ml. of solvent was distilled off in order to remove any water azeotropically. At this point a suspension of 58 g. (0.235 mole) of $\beta,\beta'$-sulfonyl bis(propionyl chloride) (M.P. 131–133° C., from sulfonyldipropionic acid and thionyl chloride) in 250 ml. of dioxane was quickly added to the above refluxing suspension and 200 ml. more dioxane was used to wash the container. The solution was refluxed for six and a half days and was then seeded with a sample of the desired product from a previous preparation and refluxed for another three days. Dioxane (500 ml.) was removed by distillation, and the reaction mixture was refluxed overnight. The suspension was cooled to 20° C. and the light tan powdery solid, A, was collected by filtration and washed with approximately 200 ml. of fresh dioxane followed by 150 ml. of benzene. There was obtained 178 g. of almost colorless product, M.P. 260–264° C. (dec.). Solid A was combined with three other solids, which were obtained from a previous preparation of the same compound, to give a total of 263 g. of solid. The mixture was dissolved in 1000 ml. of water and enough 35% sodium hydroxide to give a solution of pH 7. The dark-brown solution was treated with approximately 2 g. of crushed calcium sulfate and 3 tablespoonfuls of activated charcoal, and stirred for 10 minutes at room temperature. This mixture was filtered, the filtrate chilled at 10° C. for about 19 minutes, and the solution was stirred and acidified very slowly with 3 N hydrochloric acid to pH 2. At this point an amorphous solid precipitated. After chilling the suspension at 5° C. overnight, the solid, B, was collected by filtration, washed with 100 ml. of water, and allowed to drain well. Without drying further, B was dissolved in 700 ml. of water and 10% sodium hydroxide. The solution was acidified very slowly with 3 N hydrochloric acid to a point where the color of the supernatant solution was very light, and the amorphous solid C was collected by filtration. The clear very pale yellow filtrate from C was further acidified with 3 N hydrochloric acid to pH 1 and stirred for 10 minutes. The solid was collected by filtration, washed with 50 ml. of cold water and dried to give 218 g. of 3,3' - [3,3' - sulfonyldipropionyl)diimino]bis-[2,4,6-triiodo-5-(N-methylacetamido)benzoic acid], M.P. 254° C. (dec.).

3,3' - [3,3' - sulfonyldipropionyl)diimino]bis[2,4,6-triiodo-5-(N-methylacetamido)benzoic acid] was also prepared by treating 3,3'-[3,3'-thiodipropionyl)diimino]bis-[2,4,6-triiodo-5-(N-methylacetamido)benzoic acid] with m-chloroperbenzoic acid in dimethylformamide solution by the procedure described below in Example 15 (second paragraph).

EXAMPLE 15

3,3' - [(3,3' - sulfoxydipropionyl)diimino]bis[2,4,6-triiodo - 5 - (N-methylacetamido)benzoic acid] [II; R is $(CH_3CO)N(CH_3)$—, X is SO, n is 2] was prepared from 25.44 g. of 3-amino - 5 - (N-methylacetamido)-2,4,6-triiodobenzoic acid and 5.01 g. of 3,3'-sulfoxydipropionyl chloride in 250 ml. of dioxane. The product was isolated by concentration of the reaction mixture.

Alternatively, the foregoing product can be obtained as follows: A solution of 4.55 g. (0.0230 mole) of 85% m-chloroperbenzoic acid in 20 ml. of dimethylformamide was added over a period of 30 minutes to a solution of 30.0 g. (0.0228 mole) of 3,3'-[3,3'-thiodipropionyl)diimino]bis[2,4,6 - triiodo-5-(N-methylacetamido)benzoic acid] (Example 1) in 75 ml. of dimethylformamide at 15° C. The reaction mixture was allowed to stand for ten minutes and then poured into 300 ml. of water. The mixture was filtered and the filtrate acidified with 6 N hydrochloric acid. The solid product was collected, recrystallized from isopropyl alcohol and further purified by conversion to its sodium salt in aqueous solution and conversion back to the free acid, to give 3,3'-[3,3'-sulfoxydipropionyl)diimino]bis[2,4,6-triiodo - 5 - (N-methylacetamido)benzoic acid], M.P. 236–240° C.

EXAMPLE 16

N,N'-bis[3-(N-methylacetamido) - 5 - carboxy-2,4,6-triiodophenyl]-3',8'-dithiasebacamide [I; R is $(CH_3CO)N(CH_3)$—, R' and R" are H, Y is $CH_2SCH_2CH_2CH_2CH_2SCH_2$] was prepared from 3-amino-5-(N-methylacetamido)-2,4,6-triiodobenzoic acid and 3', 8'-dithiasebacoyl chloride $(Cl—COCH_2SCH_2CH_2CH_2CH_2SCH_2CO—Cl)$ according to the method described above in Example 1, and had the M.P. 241° C. (dec.).

EXAMPLE 17

3,3' - [oxybis(ethylenethiomethylenecarbonylimino)] bis[2,4,6 - triiodo - 5-(N-methylacetamido)benzoic acid] [I; R is $(CH_3CO)N(CH_3)$—, R' and R" are H, Y is $CH_2SCH_2CH_2OCH_2CHSCH_2$], colorless solid, M.P. 242.5° C. (dec.), was prepared from 3-amino-5-(N-methylacetamido)-2,4,6-triiodobenzoic acid and $Cl—COCH_2SCH_2CH_2OCH_2CH_2SCH_2CO—Cl$.

EXAMPLE 18

3,3' - [(3,3'-sulfonyldipropionyl)diimino]bis[2,4,6-triiodo-5-(N-ethylacetamido)benzoic acid] [II; R is $(CH_3CO)N(C_2H_5)$—, X is $SO_2$, n is 2], colorless solid, M.P. 249–254° C., was prepared from 3 - amino-5-(N-ethylacetamido)-2,4,6-triiodobenzoic acid and 3,3'-sulfonyldipropionyl chloride.

EXAMPLE 19

3,3' - [oxybis(ethylenethiomethylenecarbonylimino)] bis[5 - (N-ethylacetamido)-2,4,6-triiodobenzoic acid] [I; R is $(CH_3CO)N(C_2H_5)$—, R' and R" are H, Y is $CH_2SCH_2CH_2OCH_2CH_2SCH_2$], pale beige solid, M.P. 246° C. (dec.), was prepared from 3-amino-5-(N-ethylacetamido)-2,4,6-triiodobenzoic acid and $Cl—COCH_2SCH_2CH_2OCH_2CH_2SCH_2CO—Cl$.

EXAMPLE 20

3,3' - [(3,3'-thiodipropionyl)diimino]bis[2,4,6-triiodo-5-(N-methyl-2-methoxyacetamido)benzoic acid] [I; R is $(CH_3OCH_2CO)N(CH_3)$, R' and R" are H, Y is $CH_2CH_2SCH_2CH_2$], colorless solid, M.P. 258° C. (dec.), was prepared from 3-amino-2,4,6-triiodo-5-(N-methyl-2-methoxyacetamido) benzoic acid and 3,3'-thiodipropionyl chloride.

The intermediate 3-amino-2,4,6-triiodo-5-(N-methyl-2-methoxyacetamido)benzoic acid [III; R is $(CH_3OCH_2CO)NH$, R" is H], colorless solid, M.P. 245° C. (dec.) was prepared by reacting 3 - amino-2,4,6-triiodo-5-(2-methoxyacetamido)benzoic acid with dimethyl sulfate in dilute sodium hydroxide.

EXAMPLE 21

3,3' - [tetramethylenebis(sulfonylmethylenecarbonylimino)]bis[2,4,6 - triiodo-5-(N-methylacetamido)benzoic acid] [I; R is $(CH_3CO)N(CH_3)$—, R' and R" are H, Y is $CH_2SO_2CH_2CH_2CH_2CH_2SO_2CH_2$]. To a solution of 30.66 g. (0.0223 mole) of N,N'-bis[3-(N-methylacetamido)-5-carboxy-2,4,6-triiodophenyl]-3',8'-dithiasebacamide (Example 16) in 50 ml. of dimethylformamide at 33° C. was added a solution of 19.88 g. (0.0981 mole) of 85% m-chloroperbenzoic acid in 40 ml. of dimethylformamide during a 35 minute period, during which time the temperature of the mixture rose to 89° C. The reaction mixture was allowed to stand at room temperature for about sixteen hours, and then an additional 1 g. of m-chloroperbenzoic acid was added and the mixture stirred for one hour. The reaction mixture was added dropwise to 500 ml. of ethyl acetate with stirring. The solid product which separated was collected by filtration, and additional quantities obtained by concentration of the filtrate. The product was recrystallized from isopropyl alcohol and further purified by conversion to its sodium salt in aqueous solution and conversion back to the free acid, to give 3,3' - [tetramethylenebis(sulfonylmethylenecarbonylimino)]bis[2,4,6 - triiodo - 5-(N-methylacetamido)-benzoic acid] M.P. 273° C. (dec.).

EXAMPLE 22

3,3' - (diglycolyldiimino)bis[2,4,6 - triiodo-5-(N-ethylacetamido)-benzoic acid] [II; R is $(CH_3CO)N(C_2H_5)$—, X is O, $n$ is 1], beige powder, M.P. 238–41° C., was prepared from 50.0 g. of 3-amino-2,4,6-triiodo-5-(N-ethylacetamido)benzoic acid and 7.35 g. of diglycolyl chloride.

EXAMPLE 23

3,3' - [(thiodiacetyl)diimino]bis[2,4,6 - triiodo-5-(N-propylacetamido)benzoic acid] [II; R is $(CH_3CO)N(C_3H_7)$—, X is S, $n$ is 1], beige powder, M.P. 227–229° C., was prepared from 30.0 g. of 3-amino-2,4,6-triiodo-5-(N-propylacetamido)benzoic acid and 4.71 g. of thiodiacetyl chloride.

EXAMPLE 24

3,3' - [thiodiacetyl)diimino]bis[2,4,6 - triiodo - 5-(N-methylpropionamido)benzoic acid] [II; R is $(CH_3CH_2CO)N(CH_3)$—, X is S, $n$ is 1], colorless solid, M.P. 273° C., was prepared from 3 - amino-2,4,6-triiodo-5-(N-methylpropionamido)benzoic acid and thiodiacetyl chloride.

EXAMPLE 25

(a) 3 - cyclopropylcarboxamido - 5 - nitrobenzoic acid. Cyclopropanecarboxylic acid chloride (57.5 g.) was added over a two minute period to a solution of 91 g. of 3-amino-5-nitrobenzoic acid in dioxane at 70° C. The reaction mixture was refluxed for about sixteen hours and the product isolated to give 89 g. of 3-cyclopropylcarboxamido-5-nitrobenzoic acid, M.P. 266–266.5° C.

(b) 3 - cyclopropylcarboxamido-5-aminobenzoic acid. A solution prepared from 89.5 g. of 3-cyclopropylcarboxamido-5-nitrobenzoic acid and 142 ml. of 2.5 N sodium hydroxide was hydrogenated in the presence of 3 g. of 10% palladium-on-carbon catalyst. The catalyst was removed by filtration and the filtrate acidified. The product was collected and dried to give 62.5 g. of 3-cyclopropylcarboxamido-5-aminobenzoic acid.

(c) 3 - amino - 5-(cyclopropylcarboxamido)-2,4,6-triiodobenzoic acid [III; R is $(C_3H_5)CONH$—, R" is H]. To a solution of 62.1 g. of 3-cyclopropylcarboxamido-5-aminobenzoic acid and 95 ml. of 3 N hydrochloric acid in 750 ml. of water was added 330.5 ml. of 2.837 N aqueous sodium iododichloride solution over a period of 27 minutes. The reaction mixture was heated at about 100° C. for several days, and the product was isolated and recrystallized from an isopropyl alcohol-methanol mixture to give 3-amino-5-(cyclopropylcarboxamido)-2,4,6-triiodobenzoic acid, light tan solid, M.P. 224° C. (dec.).

(d) 3 - amino - 5-(N-methylcyclopropylcarboxamido)-2,4,6-triiodobenzoic acid [III; R is $(C_3H_5)CON(CH_3)$—, R" is H]. A solution of 59.8 g. of 3-amino-5-(cyclopropylcarboxamido)-2,4,6-triodobenzoic acid in 320 ml. of 10% sodium hydroxide solution was treated with 25.2 g. of dimethyl sulfate in 50 ml. of acetone. The product was isolated and purified by conversion to the sodium salt and back to the free acid, and by recrystallization from isopropyl alcohol, to give 3-amino-5-(N-methylcyclopropylcarboxamido) - 2,4,6 - triiodobenzoic acid, colorless solid, M.P. 268–271° C. (dec.).

(e) 3,3' - [(3,3' - thiodipropionyl)diimino]bis[2,4,6-triiodo - 5 - N - methylcyclopropylcarboxamido)benzoic acid] [II; R is $(C_3H_5)CON(CH_3)$—, X is S, $n$ is 2], M.P. 251° C. (dec.) when recrystallized from dioxane-ethyl acetate, was prepared from 20.60 g. of 3-amino-5-(N-methylcyclopropylcarboxamido)-2,4,6-triiodobenzoic acid and 3.63 g. of thiodipropionyl chloride.

According to the procedures of the preceding example, cyclohexanecarboxylic acid chloride can be caused to react with 3-amino-5-nitrobenzoic acid and the resulting 3-cyclohexylcarboxamido-5-nitrobenzoic acid converted successively to 3-cyclohexylcarboxamido - 5 - aminobenzoic acid, 3-amino - 5 - (cyclohexylcarboxamido)-2,4,6-triiodobenzoic acid, 3-amino-5-(N-methylcyclohexylcarboxamido)-2,4,6-triiodobenzoic acid, and 3,3'-[(3,3'-thiodipropionyl)diimino]bis[2,4,6-triiodo - 5 - (N-methylcyclohexylcarboxamido)benzoic acid].

EXAMPLE 26

3,3' - [(3,3' - dithiodipropionyl)diimino]bis[2,4,6 - triiodo-5-(N-methylacetamido)benzoic acid] [I; R is $(CH_3CO)N(CH_3)$—, R' and R" are H, Y is $CH_2CH_2S$—$SCH_2CH_2$]: A solution of 48.6 g. of 3-amino-5-(N-methylacetamido)-2,4,6-triiodobenzoic acid in 500 ml. of dioxane was distilled until 100 ml. of solvent had been removed. Toluene (100 ml.) was then added, followed by 5.07 g. of 3,3'-dithiopropionyl chloride (prepared from 3,3'-dithiopropionic acid and thionyl chloride). The mixture was refluxed for 16 hours, 5.09 g. of additional 3,3'-dithiopropionyl chloride added and the mixture refluxed for five days. The solid product (43 g.) was collected, purified by conversion to the sodium salt with aqueous sodium salt and acidification with hydrochloric acid to regenerate the free acid. The latter was recrystallized from a methanol-isopropyl alcohol mixture using activated charcoal for decolorizing purposes to give 3,3' - [(3,3' - dithiodipropionyl)diimino]bis[2,4,6-triiodo-5-(N-methylacetamido)benzoic acid], M.P. 246° C. (dec.).

EXAMPLE 27

(a) 3-amino-2,4,6-triiodo - 5 - (N - methylmethanesulfonamido)benzoic acid: To a solution of the sodium salt of 3-amino-2,4,6-triiodo-5-(methanesulfonamido)benzoic acid [M.P. 229–240° C. (dec.)], prepared from 30.4 g. of the free acid and 20 g. of sodium hydroxide in 120 ml. of water, was added dropwise over 35 minutes at 9° C. 12.6 g. of dimethyl sulfate in 20 ml. of acetone. The reaction mixture was stirred at room temperature with additional dimethyl sulfate being added at intervals of two hours. When thin layer chromatography showed the reaction to be essentially complete, the reaction mixture was filtered and acidified with hydrochloric acid. The free acid (27.85 g.) was recrystallized from methanol, using activated charcoal for decolorizing purposes to give 3-amino-2,4,6-triiodo - 5 - (N-methylmethanesulfonamido)benzoic acid, M.P. 243–243.5° C. (dec.).

(b) 3,3' - [(3,3' - thiodipropionyl)diimino]bis[2,4,6-triiodo - 5 - (N-methylmethanesulfonamido)benzoic acid] [I; R is $(CH_3SO_2)N(CH_3)$—, R and R" are H, Y is $CH_2CH_2SCH_2CH_2$] was prepared from 3-amino-2,4,6-triiodo-5-(N-methylmethanesulfonamido)benzoic acid and 3,3'-thiodipropionyl chloride according to the procedure of Example 2. The resulting product was recrystallized twice from an acetonitrile-methanol mixture to give 3,3'-[(3,3'-thiodipropionyl)diimino]bis[2,4,6-triiodo - 5 - (N-methylmethanesulfonamido)benzoic acid], M.P. 249.5–251.5° C. (dec.).

EXAMPLE 28

(a) Methyl 3-amino-2,4,6-triiodo - 5 - (N-methylmethanesulfonamido)benzoate: The procedure of Example 27(a) was repeated except that the addition of dimethyl sulfate was carried out at 40° C. instead of 9° C. which produced significant esterification as well as N-methylation. The base-insoluble material was collected and recrystallized from methanol to give methyl 3-amino-2,4,6-triiodo-5-(N - methylmethanesulfonamido)benzoate, pale yellow solid, M.P. 225-227° C.

(b) Dimethyl 3,3' - [(3,3' - thiodipropionyl)diimino]bis[2,4,6 - triiodo - 5 - (N - methylmethanesulfonamido)benzoate] [I; R is $(CH_3SO_2)N(CH_3)$—, R' is H, R" is $CH_3$, Y is $CH_2CH_2SCH_2CH_2$] can be prepared from methyl 3-amino-2,4,6-triodo - 5 - (N-methylmethansulfonamido)benzoate and thiodipropionyl chloride according to the procedure of Example 2.

EXAMPLE 29

5,5' - [(3,3' - thiodipropionyl)diimino]bis[2,4,6-triiodo-N,N-dimethylisophthalamic acid] [I; R is $(CH_3)_2NCO$—, R' and R" are H, Y is $CH_2CH_2SCH_2CH_2$] was prepared from 5-amino-2,4,6-triiodo-N,N - dimethylisophthalamic acid [M.P. 266-270° C. (dec.)] and 3,3'-thiodipropionyl chloride according to the procedure of Example 2, and had the M.P. 290° C. (dec.) when recrystallized from methanol.

EXAMPLE 30

(a) 3-nitro-5-(3,6,9 - trioxadecanamido)benzoic acid: A mixture of 14.6 g. of 3-amino-5-nitrobenzoic acid and 17.1 g. of 3,6,9-trioxadecanoic acid chloride in 200 ml. of dioxane was heated at reflux for 24 hours. The reaction mixture was concentrated to remove the solvent. The residue was dissolved in dilute sodium hydroxide and then acidified with hydrochloric acid. The resulting product (13.6 g., M.P. 130° C.) was recrystallized from acetonitrile to give 3-nitro-5-(3,6,9-trioxadecanamido)benzoic acid as a beige solid, M.P. 136-137° C.

(b) 3-amino - 5-(3,6,9-trioxadecanamido)benzoic acid was prepared by hydrogenation of 80 g. of 3-nitro-5-(3,6,9-trioxadecanamido)benzoic acid in absolute ethanol in the presence of palladium-on-charcoal catalyst. There was thus obtained 54.7 g. of 3-amino-5-(3,6,9-trioxadecanamido)benzoic acid, M.P. 130.5-131° C. when recrystallized from isopropyl alcohol.

(c) 3-amino-2,4,6-triiodo - 5 - (3,6,9 - trioxadecanamido)benzoic acid was prepared by iodination of 3-amino-5-(3,6,9-trioxadecanamido)benzoic acid with sodium iododichloride according to the procedure of Example 25, part (c), and was obtained in the form of a tan solid, M.P. 177-178° C. when recrystallized from methanol and a methanol-benzene mixture.

(d) 3-amino-2,4,6-triiodo - 5 - (N-methyl-3,6,9-trioxadecanamido)benzoic acid was prepared by methylation of 3-amino-2,4,6-triiodo - 5 - (3,6,9 - trioxadecanamido)benzoic acid with dimethyl sulfate according to the procedure of Example 25, part (d), and was obtained as an amorphous pink solid, M.P. 100-109° C. when recrystallized from methanol.

(e) 3,3' - [(3,3' - thiodipropionyl)diimino]bis[2,4,6-triiodo - 5 - (N-methyl - 3,6,9 - trioxadecanamido)benzoic acid] [I; R is $H(CH_2OCH_2)_3CON(CH_3)$—, R' and R" are H, Y is $CH_2CH_2SCH_2CH_2$] can be prepared from 3 - amino - 2,4,6 - triiodo - 5 - (N-methyl - 3,6,9-trioxadecanamido)benzoic acid and 3,3'-thiodipropionyl chloride according to the procedure of Example 2.

Similarly, starting with 3,6,9,12 - tetraoxatridecanoic acid chloride in part (a) above there can be obtained 3,3' - [(3,3' - thiodipropionyl)diimino]bis[2,4,6-triiodo-5 - (N-methyl - 3,6,9,12 - tetraoxatridecanamido)benzoic acid] [I; R is $H(CH_2OCH_2)_4CON(CH_3)$—, R' and R" are H, Y is $CH_2CH_2SCH_2CH_2$].

EXAMPLE 31

3,3' - [(3,3' - thiodipropionyl)diimino]bis[2,4,6 - triiodo - 5 - (acetylaminomethyl)benzoic acid] [I; R is $CH_2CONHCH_2$, R' and R" are H, Y is $CH_2CH_2SCH_2CH_2$]

can be prepared from 3 - amino - 5 - acetamidomethyl-2,4,6-triiodobenzoic acid and 3,3'-thiodipropionyl chloride according to the procedure of Example 2.

I claim:

1. A compound having the formula

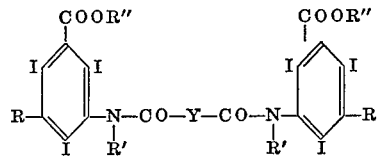

wherein R is $H_2N$, (lower-alkanoyl)$_2$N, (lower-alkyl)NHCO, (lower-alkyl)$_2$NCO, (lower-alkyl)$_2$NCH=N, T—CO—NH, or (T—CO)N(lower-alkyl), where T is hydrogen, cycloalkyl of 3-6 ring members, or alkyl of 1-8 carbon atoms optionally interrupted by from 1 to 4 oxygen atoms, each oxygen, when more than one, being separated by at least two carbon atoms; R' is hydrogen or lower-alkyl; R" is hydrogen or lower-alkyl; and Y is an alkylene bridge having from two to eight carbon atoms and interrupted by from one to three members selected from SO and $SO_2$, said members, when more than one, being separated by at least two carbon atoms.

2. A compound according to claim 1 wherein R is (lower-alkanoyl)N(lower-alkyl), R' and R" are hydrogen, and Y is an alkylene bridge having from two to eight carbon atoms and interrupted by from one to three $SO_2$ groups.

3. A compound according to claim 1 wherein R is (lower-alkanoyl)N(lower-alkyl), R' and R" are hydrogen, and Y is $(CH_2)_n$—X—$(CH_2)_n$, X being SO or $SO_2$, and $n$ being an integer from 1 to 4.

4. 3,3' - [(3,3' - sulfonyldipropionyl)diimino]bis[2,4,6-triiodo-5-(N-methylacetamido)benzoic acid], according to claim 3, wherein R is N-methylacetamido and Y is $CH_2CH_2SO_2CH_2CH_2$.

5. 3,3' - [(3,3' - sulfonyldipropionyl)diimino]bis[2,4,6-triiodo-5-(N-ethylacetamido)benzoic acid], according to claim 3, wherein R is N-ethylacetamido and Y is $CH_2CH_2SO_2CH_2CH_2$.

6. 3,3' - [tetramethylenebis(sulfonylmethylenecarbonylimino)]bis[2,4,6 - triiodo - 5 - (N-methylacetamido)benzoic acid], according to claim 3, wherein R is N-methylacetamido and Y is $CH_2SO_2CH_2CH_2CH_2CH_2SO_2CH_2$.

7. 3,3' - [(3,3' - thiodipropionyl)diimino]bis[2,4,6-triiodo-5-(N-methylacetamido)benzoic acid].

8. 3,3' - [(thiodiacetyl)diimino]bis[2,4,6 - triiodo-5-(N-ethylacetamido)benzoic acid].

References Cited

UNITED STATES PATENTS

| | | | |
|---|---|---|---|
| 3,178,473 | 4/1965 | Holterman | 260—518 A |
| 2,776,241 | 1/1957 | Priewe et al. | 280—518 A |
| 3,290,366 | 12/1966 | Hoey | 260—518 A |
| 3,541,141 | 11/1970 | Berstein et al. | 260—471 R |
| 3,306,927 | 2/1967 | Larsen | 260—471 |
| 2,853,424 | 9/1958 | Priewe | 167—95 |

OTHER REFERENCES

Chemical Abstract, 71.38603c (1969), of South African Pat. 68/02,537 issued Sept. 27, 1968.

LORRAINE A. WEINBERGER, Primary Examiner

J. F. TERAPANE, Assistant Examiner

U.S. Cl. X.R.

260—470, 518, 519; 424—5